US012640416B2

(12) United States Patent
Ogaki

(10) Patent No.: US 12,640,416 B2
(45) Date of Patent: May 26, 2026

(54) BATTERY TEMPERATURE ADJUSTMENT SYSTEM

(71) Applicant: HONDA MOTOR CO., LTD., Tokyo (JP)

(72) Inventor: Toru Ogaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 618 days.

(21) Appl. No.: 18/100,066

(22) Filed: Jan. 23, 2023

(65) Prior Publication Data

US 2023/0238602 A1 Jul. 27, 2023

(30) Foreign Application Priority Data

Jan. 24, 2022 (JP) ................................. 2022-008958

(51) Int. Cl.
| | |
|---|---|
| *H01M 10/63* | (2014.01) |
| *B60L 50/64* | (2019.01) |
| *B60L 53/64* | (2019.01) |
| *B60L 58/26* | (2019.01) |
| *H01M 10/613* | (2014.01) |
| *H01M 10/625* | (2014.01) |
| *B60L 50/51* | (2019.01) |

(52) U.S. Cl.
CPC ............ *H01M 10/63* (2015.04); *B60L 50/64* (2019.02); *B60L 53/64* (2019.02); *B60L 58/26* (2019.02); *H01M 10/613* (2015.04); *H01M 10/625* (2015.04); *B60L 50/51* (2019.02); *B60L 2250/16* (2013.01); *H01M 2220/20* (2013.01)

(58) Field of Classification Search
CPC ..... B60L 58/24–26; H01M 10/60–613; H01M 10/63–637; H01M 10/65–667; H01M 10/486
See application file for complete search history.

(56) References Cited

U.S. PATENT DOCUMENTS

| | | | |
|---|---|---|---|
| 2020/0171975 A1 | 6/2020 | Ueda et al. | |
| 2021/0408616 A1 | 12/2021 | Ogaki et al. | |

FOREIGN PATENT DOCUMENTS

| | | |
|---|---|---|
| CN | 113302780 A | 8/2021 |
| JP | 2015-037011 A | 2/2015 |

(Continued)

OTHER PUBLICATIONS

WO-2021024732-A1 English (Year: 2021).*

(Continued)

*Primary Examiner* — Bach T Dinh
(74) *Attorney, Agent, or Firm* — Paratus Law Group, PLLC

(57) ABSTRACT

A battery temperature adjustment system includes: a battery configured to store electric power from an external power source, and supply electric power to a motor as a drive source of a vehicle; a cooling device to which the electric power from the external power source and the electric power from the battery are selectively supplied and configured to cool the battery; and a control device configured to control the cooling device to lower a temperature of the battery to a target cooling temperature while the vehicle is stopped. The target cooling temperature is a variable value. The control device obtains a target set by a user, and sets the target cooling temperature based on the target.

6 Claims, 6 Drawing Sheets

(56)  References Cited

FOREIGN PATENT DOCUMENTS

| JP | 2020-096508 A | 6/2020 |
| JP | 2020-137200 A | 8/2020 |
| JP | 2022-011148 A | 1/2022 |
| WO | WO-2021024732 A1 * | 2/2021 |

OTHER PUBLICATIONS

May 23, 2023, Translation of Japanese Office Action issued for related JP Application No. 2022-008958.
Dec. 30, 2025, Translation of Chinese Office Action issued for related CN Application No. 202310037589.1.

* cited by examiner

*FIG. 2*

BATTERY TEMPERATURE ADJUSTMENT SYSTEM

CROSS-REFERENCE TO RELATED APPLICATIONS

The present application claims the benefit of priority of Japanese Patent Application No. 2022-008958, filed on Jan. 24, 2022, the content of which is incorporated herein by reference.

TECHNICAL FIELD

The present disclosure relates to a battery temperature adjustment system that adjusts a temperature of a battery mounted on an electric vehicle or the like.

BACKGROUND ART

In recent years, as a specific measure against climatic variation of the earth, efforts to realize a low-carbon society or a decarbonized society have been actively made. Also in vehicles, a reduction in $CO_2$ emission amount is strongly required, and a drive source is rapidly electrified. Specifically, a vehicle including an electric motor as a drive source of the vehicle and a battery as a secondary battery capable of supplying electric power to the electric motor, such as an electrical vehicle or a hybrid electrical vehicle, has been developed.

In such an electric vehicle, the battery is cooled in order to prevent the battery from having a high temperature and being deteriorated when the vehicle is stopped (for example, JP-A-2015-37011).

In general, a target cooling temperature of a battery is preset as a fixed value regardless of a region where a vehicle is used. However, when the target cooling temperature is set as the fixed value, depending on the region where the vehicle is used, in some cases, a deterioration prevention effect of the battery intended by a user cannot be achieved.

SUMMARY

The present disclosure provides a battery temperature adjustment system capable of achieving a deterioration prevention effect of a battery intended by a user.

According to an aspect of the present disclosure, there is provided a battery temperature adjustment system including: a battery configured to store electric power from an external power source, and supply electric power to a motor as a drive source of a vehicle; a cooling device to which the electric power from the external power source and the electric power from the battery are selectively supplied and configured to cool the battery; and a control device configured to control the cooling device to lower a temperature of the battery to a target cooling temperature while the vehicle is stopped, where: the target cooling temperature is a variable value and the control device obtains a target set by a user, and sets the target cooling temperature based on the target.

According to the present disclosure, a deterioration prevention effect of a battery intended by a user can be achieved.

BRIEF DESCRIPTION OF THE DRAWINGS

FIG. 2 is a block diagram showing a configuration of the battery temperature adjustment system 1 of the present disclosure.

DESCRIPTION OF EMBODIMENTS

A battery temperature adjustment system according to an embodiment of the present disclosure will be described below with reference to the drawings.

[Vehicle]

Figure 1:
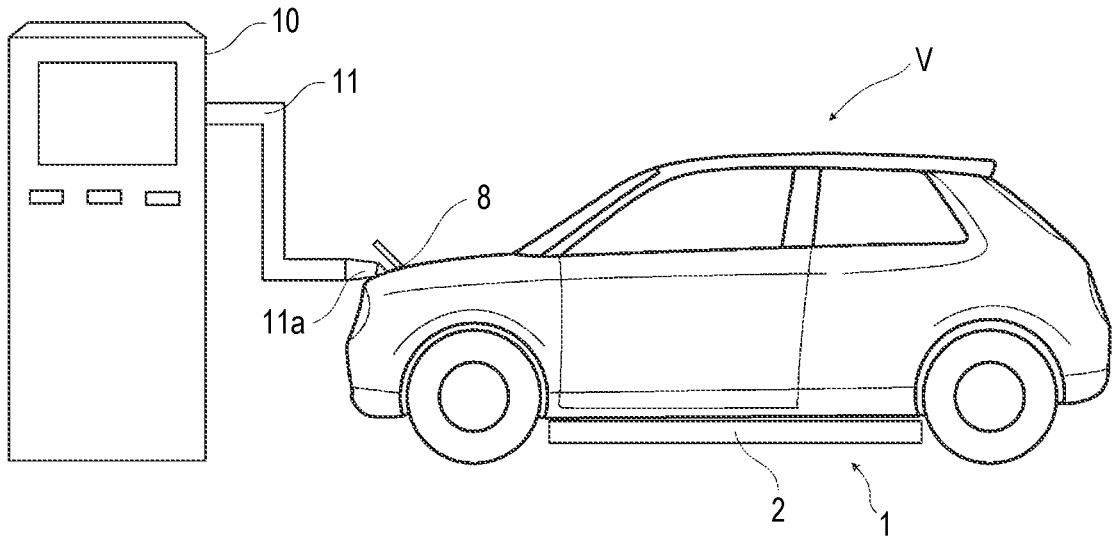
FIG. 1 is a schematic diagram showing a vehicle V mounted with a battery temperature adjustment system I of the present disclosure.
Figure 2:
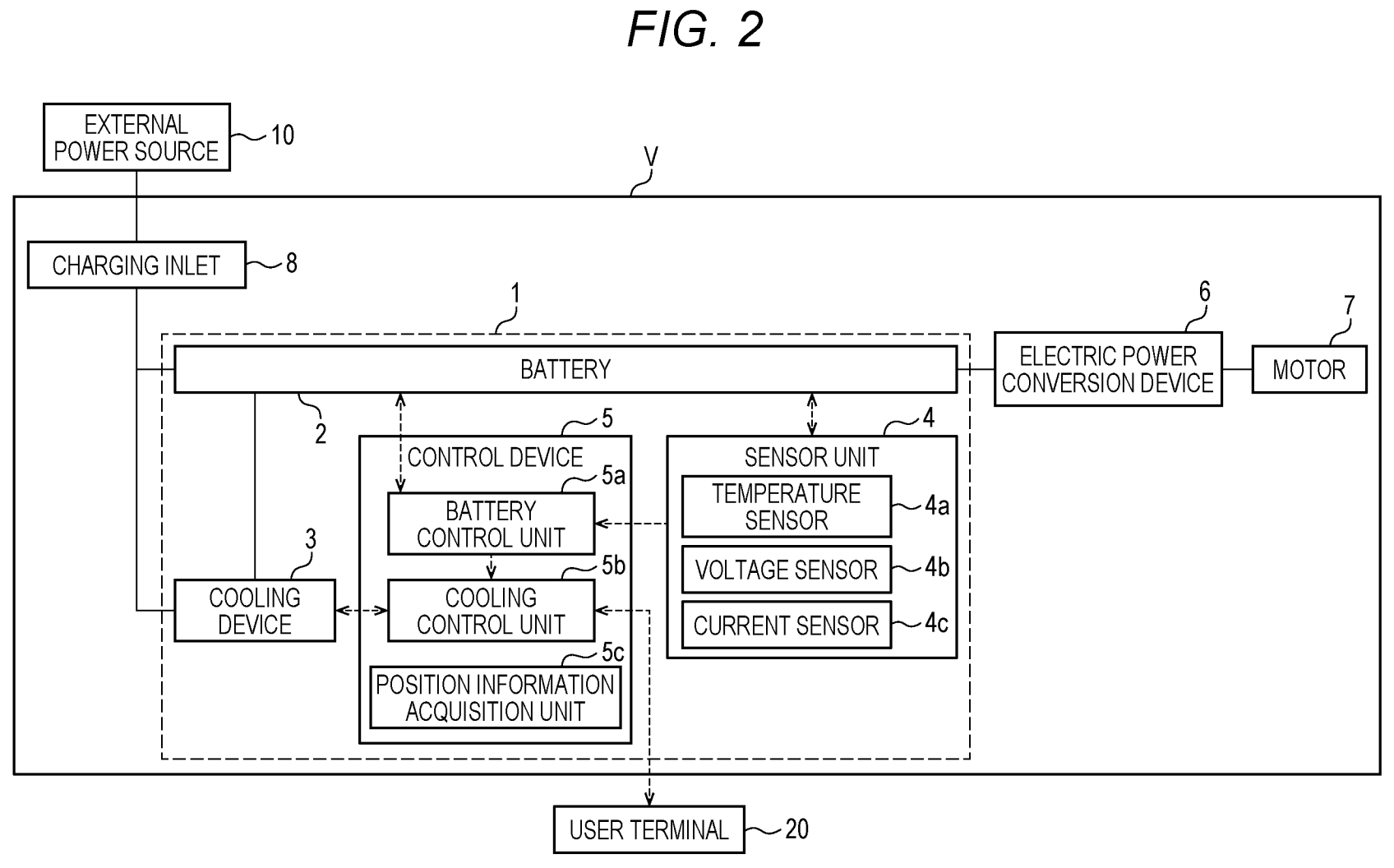

As shown in FIGS. 1 and 2, a battery temperature adjustment system 1 according to the present embodiment is mounted on a vehicle V. The vehicle V is, for example, an electric vehicle such as a plug-in hybrid vehicle or an electrical vehicle, and is configured such that a battery 2 can store electric power from an external power source 10 provided at a charging station, at home, or the like. The vehicle V is configured to be able to travel by driving a motor 7 as a drive source by the electric power stored in the battery 2.

The vehicle V is connected to (plugged into) the external power source 10 by connecting, to a charging inlet 8 provided in the vehicle V, a charging plug 11a of a charging cable 11 extending from the external power source 10. It should be noted that the connection between the vehicle V and the external power source 10 is not limited thereto. For example, the vehicle V may be provided with an electric power receiving coil or the like capable of contactlessly receiving electric power transmitted from the external power source 10.

The vehicle V is configured to be able to communicate with a user terminal 20 held by a user. The user terminal 20 is, for example, a smartphone or a tablet terminal that can be carried by the user, and may be a navigation device installed in the vehicle V.

[Battery Temperature Adjustment System]

The battery temperature adjustment system 1 includes the battery 2, a cooling device 3 that cools the battery 2, a sensor unit 4 that detects a state of the battery 2, and a control device 5 that controls the cooling device 3.

The battery 2 is formed by stacking a plurality of battery cells (not shown), and is, for example, a lithium ion battery or a nickel metal hydride battery. The battery 2 is connected to the external power source 10 by connecting the charging plug 11a to the charging inlet 8, and is configured to be able to store the electric power from the external power source 10. The electric power stored in the battery 2 is converted from a direct current into an alternating current by an inverter included in an electric power conversion device 6, and is supplied to the motor 7. In addition, when an alternating current generated by the motor 7 during braking of the vehicle V is input to the electric power conversion device 6, the alternating current is converted to a direct current by the inverter and supplied to the battery 2. That is, the battery 2 is configured to be able to store regenerated electric power.

The cooling device 3 cools the battery 2 by causing a refrigerant to flow through a refrigerant flow channel provided in the battery 2. The cooling device 3 is, for example, a water-cooled type, circulates the refrigerant by a pump, and cools the refrigerant by a radiator. It should be noted that a heater is provided in the cooling device 3, and the battery 2 can also be heated.

The electric power stored in the battery 2 is supplied to the cooling device 3. In addition, when the vehicle V is connected to the external power source 10, the electric power from the external power source 10 can be supplied to the cooling device 3. It should be noted that when the vehicle V is connected to the external power source 10, the electric power from the external power source 10 and the electric power from the battery 2 may be selectively supplied to the cooling device 3.

The sensor unit 4 includes a temperature sensor 4a that acquires a temperature of the battery 2 (hereinafter also referred to as battery temperature), a voltage sensor 4b that measures a voltage of the battery 2, and a current sensor 4c that measures a current flowing through the battery 2.

The control device 5 includes a battery control unit 5a that controls charging and discharging of the battery 2, a cooling control unit 5b that controls the cooling device 3, and a position information acquisition unit 5c that acquires position information of the vehicle V. For example, the control device 5 is implemented by an electronic control unit (ECU) including a processor, a memory, an interface, and the like. It should be noted that the battery control unit 5a, the cooling control unit 5b, and the position information acquisition unit 5c may be configured as separate control devices. For example, the position information acquisition unit 5c may be included in the navigation device.

The battery temperature, the voltage of the battery 2, the current of the battery 2, and the like are input from the sensor unit 4 to the battery control unit 5a. In addition, the battery control unit 5a calculates a state of charge (SOC) of the battery 2 based on the input voltage and current. The battery control unit 5a controls charging and discharging of the battery 2 based on these input values and the SOC.

The cooling control unit 5b operates the cooling device 3 such that the battery temperature is within a target cooling temperature range (hereinafter also simply referred to as target cooling temperature). In addition to operating the cooling device 3 while the vehicle V is traveling, the cooling control unit 5b operates the cooling device 3 such that the battery temperature is maintained within the target cooling temperature when the battery temperature exceeds the target cooling temperature even while the vehicle V is stopped. The time when the battery temperature exceeds the target cooling temperature while the vehicle V is stopped corresponds to, for example, a time when the vehicle V is stopped in a high temperature environment for a certain period of time.

The position information acquisition unit 5c acquires the position information of the vehicle V that receives a global positioning system (GPS) signal. The position information can be acquired at any timing, and for example, the position information is acquired at predetermined intervals.

[Target Cooling Temperature of Battery]

Next, the target cooling temperature of the battery 2 will be described.

In the related art, a target cooling temperature of a battery is preset as a fixed value regardless of a region where a vehicle is used. Accordingly, a deterioration prevention effect by cooling the battery differs depending on the region where the vehicle is used.

For example, when the target cooling temperature is preset as a fixed value of 30° C., in a high temperature region A (also simply referred to as region A) where an outside air temperature frequently exceeds 30° C. a frequency of a battery cooling operation performed when the vehicle is stopped is high, and an electric power required to maintain the battery temperature within the target cooling temperature is large. On the other hand, in a moderately high temperature region B (also simply referred to as region B) where the outside air temperature exceeds 30° C. less frequently than the region A, the frequency of the battery cooling operation performed when the vehicle is stopped is low, and the electric power required to maintain the battery temperature within the target cooling temperature is small. Therefore, the deterioration prevention effect by cooling the battery in the region B is lower than the deterioration prevention effect by cooling the battery in the region A. In a case in which there is an intention of the user to enhance the deterioration prevention effect in the region B which has a relatively low deterioration prevention effect as compared with the region A, when the target cooling temperature of the battery is a fixed value, the intention of the user cannot be reflected.

Figure 3:
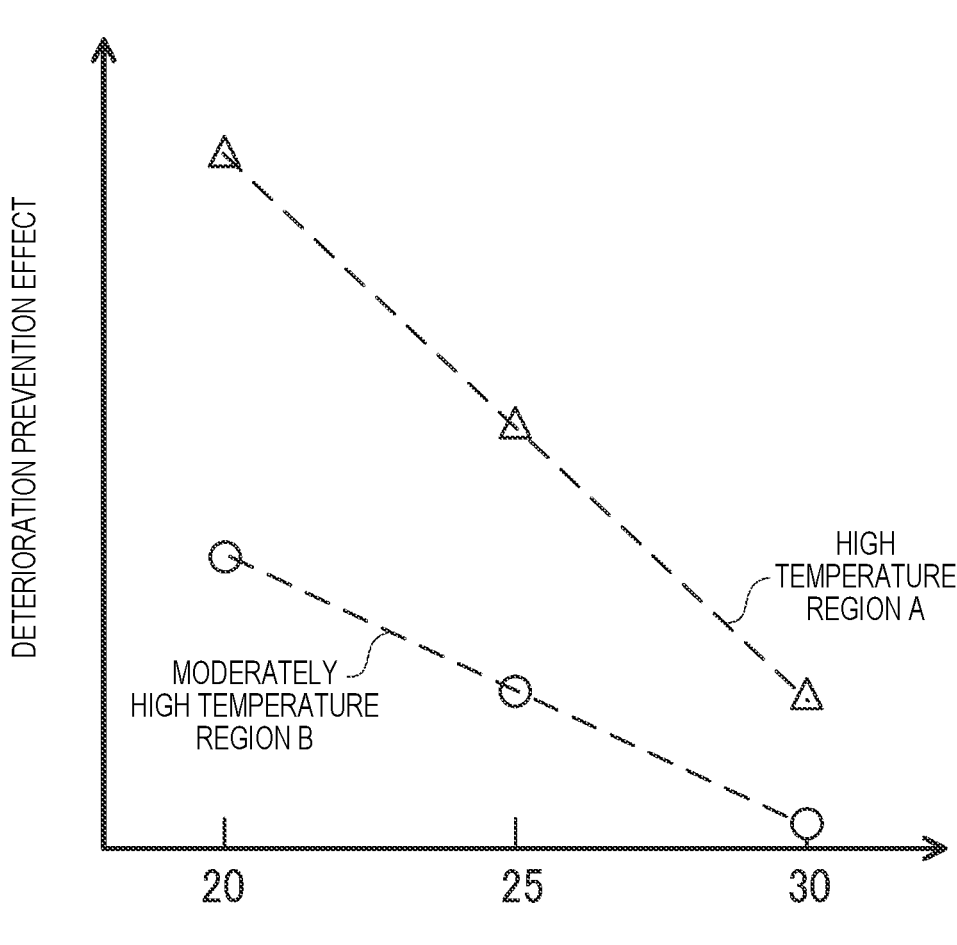
FIG. 3 is a diagram showing a relationship between a target cooling temperature and a deterioration prevention effect in each of a region A and a region B.

FIG. 3 is a diagram showing an example of a relationship between the target cooling temperature and the deterioration prevention effect in each of the region A and the region B. When the target cooling temperature is low, since an operation frequency of the cooling device 3 is increased, a cooling effect of the battery 2 is enhanced. Therefore, as shown in FIG. 3, the lower the target cooling temperature, the higher the deterioration prevention effect of the battery 2.

In the present embodiment, the target cooling temperature of the battery 2 is a variable value, and the target cooling temperature can be appropriately set based on a target set by the user. Specifically, as shown in FIG. 3, when the vehicle V is used in the region B, for example, by setting the target cooling temperature to 25° C., the deterioration prevention effect by cooling the battery 2 can be enhanced as compared with the case in which the target cooling temperature is set to 30° C., in the example shown in FIG. 3, the deterioration prevention effect in the region B when the target cooling temperature is 25° C. is equivalent to the deterioration prevention effect in the region A when the target cooling temperature is 30° C.

An example of the target set by the user is a numerical value related to electric power consumption of the cooling device 3. For example, the numerical value represents an electricity expense corresponding to the electric power consumption of the cooling device 3 for a predetermined time period (for example, one month). By setting the target set by the user to a numerical value, the deterioration prevention effect of the battery 2 intended by the user can be finely set. In addition, by setting the electricity expense as the target, the user can set the numerical value of the target in an easy-to-understand form. The predetermined time period can be freely determined, and may be one day or one year. It should be noted that the numerical value related to the electric power consumption of the cooling device 3 may be the electric power consumption itself in the predetermined time period instead of the electricity expense.

Another example of the target set by the user is a degree of the deterioration prevention effect of the battery 2. For example, an option with a high deterioration prevention effect of the battery 2, an option with a low deterioration prevention effect of the battery 2, and an option with a deterioration prevention effect between the high deterioration prevention effect and the low deterioration prevention effect are prepared, and the user sets a target by selecting an option from the options. Accordingly, the user can directly select the deterioration prevention effect of the battery 2 intended by the user.

Figure 4:
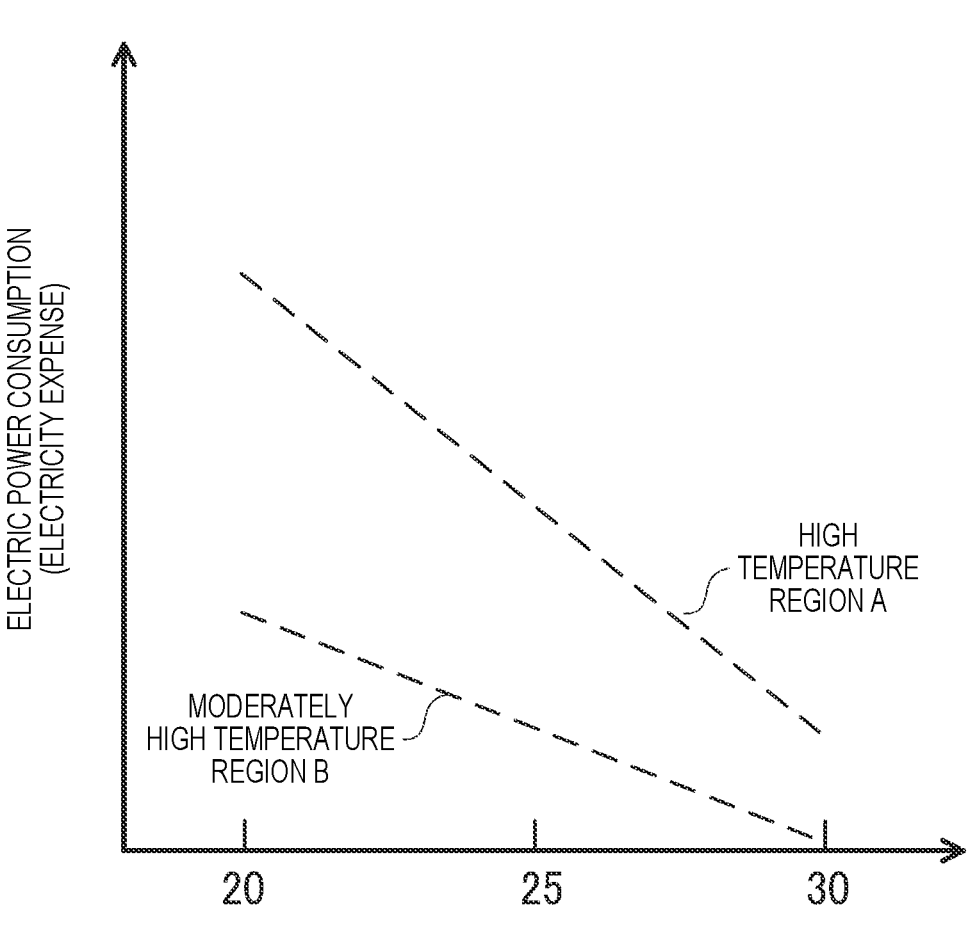
FIG. 4 is a diagram showing a relationship between the target cooling temperature and an electric power consumption amount in each of the region A and the region B.

FIG. 4 is a diagram showing an example of a relationship between the target cooling temperature and the electric power consumption (electricity expense) in each of the region A and the region B. When the target cooling temperature is lowered, the operation frequency of the cooling device 3 is increased, and the electric power required to maintain the battery temperature within the target cooling temperature is large, and thus, the electric power consumption of the cooling device 3 is increased.

When the user sets the electricity expense as the target and sets an upper limit of the electricity expense to a low level in order to reduce the electricity expense, the cooling control unit 5b sets the target cooling temperature to a high level to reduce the electric power consumption of the cooling device 3. In this case, since the target cooling temperature is high, the deterioration prevention effect of the battery 2 is lowered. On the other hand, when the user sets the upper limit of the electricity expense to a high level in order to enhance the deterioration prevention effect of the battery 2 and extend a life of the battery 2, the cooling control unit 5b sets the target cooling temperature to a low level to enhance the deterioration prevention effect of the battery 2. In this case, the electric power consumption of the cooling device 3 is increased. In the example shown in FIG. 4, in a case in which the target cooling temperature is set to 30° C. and the vehicle V is used in the region A and a case in which the target cooling temperature is set to 25° C. and the vehicle V is used in the region B, the electric power consumptions of the cooling device 3 thereof are equal, that is, monthly electricity expenses thereof are equal.

When the user selects the degree of the deterioration prevention effect of the battery 2 as the target and selects an option to lower the deterioration prevention effect of the battery 2, the cooling control unit 5b sets the target cooling temperature to a high level. In this case, since the electric power consumption of the cooling device 3 is reduced, the electricity expense is reduced. On the other hand, when an option to enhance the deterioration prevention effect of the battery 2 is selected, the cooling control unit 5b sets the target cooling temperature to a low level. In this case, since the electric power consumption of the cooling device 3 is increased, the electricity expense is increased.

Thus, there is a trade-off relationship between the deterioration prevention effect of the battery and the electricity expense required for deterioration prevention. In the present embodiment, the target cooling temperature is a variable value, and by setting the target cooling temperature of the battery 2 based on the target set by the user, it is possible to appropriately reflect the intention of the user regarding the deterioration prevention effect and the electricity expense. Therefore, the deterioration prevention effect of the battery 2 intended by the user can be achieved.

Further, in the present embodiment, the cooling control unit 5b preferably stores a recommended value of the target cooling temperature according to a region where the vehicle V is used. For example, the cooling control unit 5b stores a recommended value of the target cooling temperature for the region A (for example, 30° C.) and a recommended value of the target cooling temperature for the region B (for example, 25° C.). It should be noted that the cooling control unit 5b may store in advance the recommended value of the target cooling temperature for each region, or may access an external server and acquire the recommended value each time the vehicle V moves to each region. In addition, the cooling control unit 5b may derive the recommended value from a formula, a map, or the like instead of storing the recommended value.

When the user does not set a target and the cooling control unit 5b cannot acquire the target, the cooling control unit 5b may set the target cooling temperature to the recommended value for the region. For example, when the vehicle V is used in the region A, the cooling control unit 5b can set the target cooling temperature to 30° C. which is the recommended value for the region, and when the vehicle V is used in the region B, the cooling control unit 5b can set the target cooling temperature to 25° C. which is the recommended value for the region. Therefore, compared with the case in which the target cooling temperature is preset as the fixed value of 30° C., the deterioration prevention effect can be enhanced in the region B, and the deterioration prevention effect same as that in the region A can be achieved. Thus, when the target set by the user is not obtained, by setting the target cooling temperature of the battery 2 to a recommended value based on the region where the vehicle V is used, even when the user does not set the target, the deterioration prevention effect of the battery 2 can be exerted in any region where the vehicle V is used.

It should be noted that the target cooling temperature is preferably variable within a range in which the cooling device 3 does not consume more electric power than a predetermined value. That is, the target cooling temperature has a lower limit value for each region. Accordingly, it is possible to prevent the cooling device 3 from being operated while consuming excessive electric power.

[Enhancement of Battery Deterioration Prevention]

Next, control for enhancing the deterioration prevention of the battery 2 will be described with reference to FIGS. 5 and 6.

Figure 5:
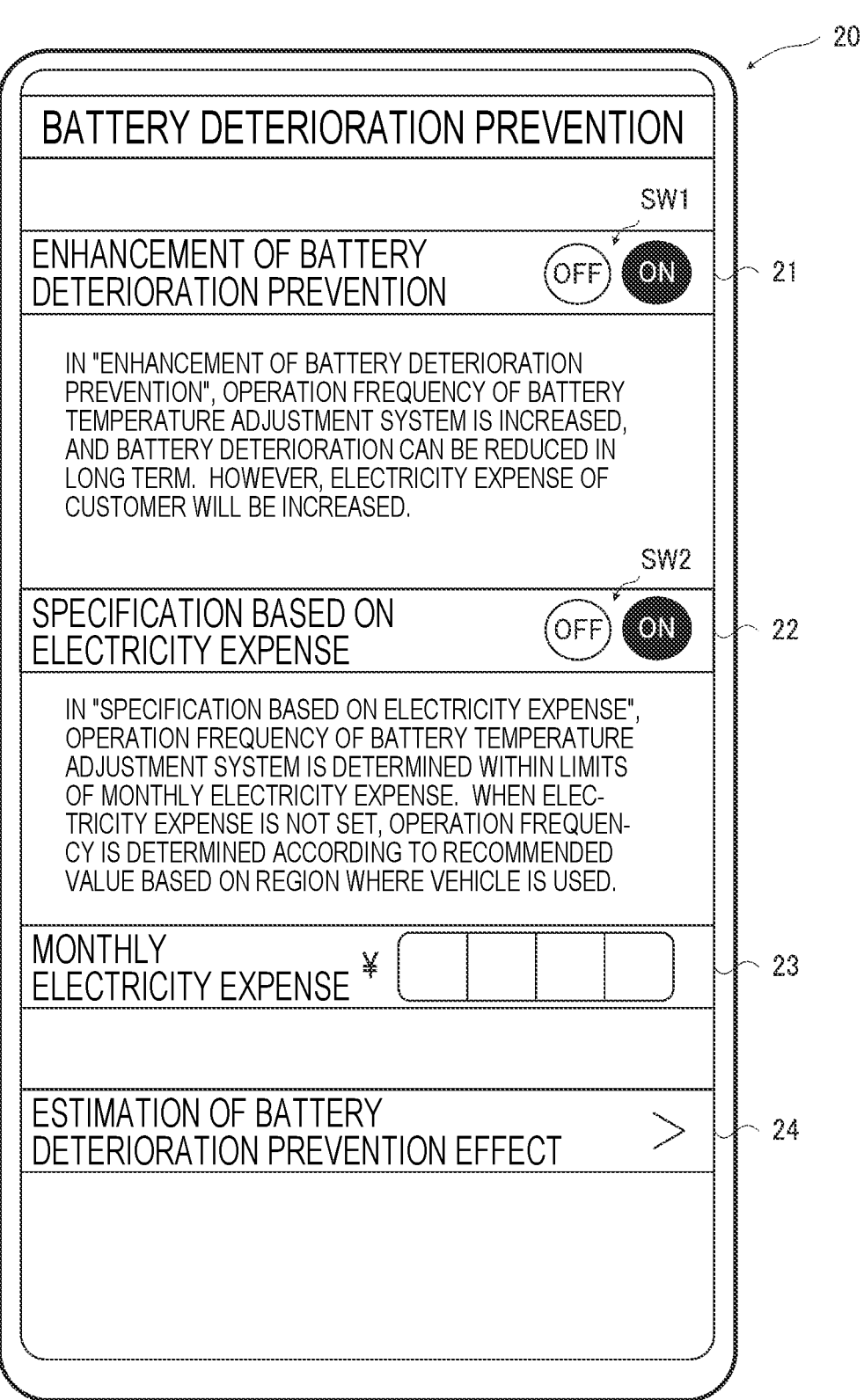
FIG. 5 is an example of a screen displayed on a user terminal 20 for setting enhancement of deterioration prevention of a battery 2.
Figure 6:
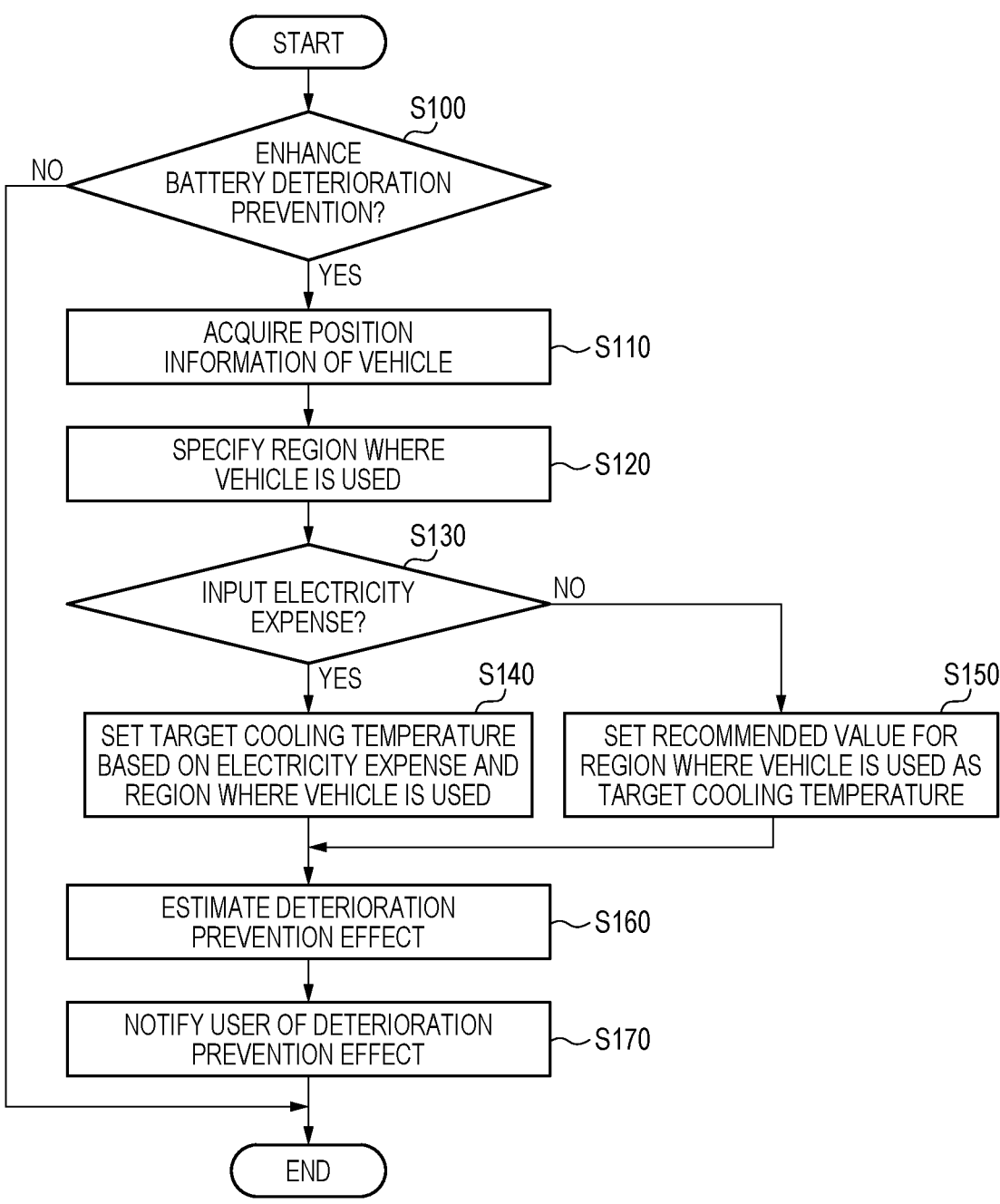
FIG. 6 is a diagram showing control flows executed by a control device 5.

FIG. 5 is an example of a screen displayed on the user terminal 20 for the user to set a target for the deterioration prevention of the battery 2. Here, a case in which the user terminal 20 is a smart phone is shown.

A switch SW1 that allows the user to select whether to enhance the deterioration prevention of the battery 2 is displayed in a display area 21, and in FIG. 5, the switch SW1 is in an ON state.

A switch SW2 that allows the user to select whether to determine the deterioration prevention effect of the battery 2 based on the monthly electricity expense is displayed in a display area 22. The switch SW2 is operable when the switch SW1 is in the ON state. In FIG. 5, the switch SW2 is in an ON state.

In a display area 23, the monthly electricity expense can be input. In the display area 23, the electricity expense can be input when the switch SW2 is in the ON state. It should be noted that the monthly electricity expense may be input in a format in which the user directly inputs numbers, or may be input in a format in which one is selected from previously prepared candidates for the electricity expense.

The deterioration prevention effect of the battery 2 is displayed in a display area 24. The example of FIG. 5 is configured such that when the user touches the display area 24, another screen is displayed, and the user can confirm the deterioration prevention effect of the battery 2 achieved based on the electricity expense set by the user. Therefore, the user can confirm the deterioration prevention effect of the battery 2 according to the spent electricity expense.

Subsequently, control flows for enhancing the deterioration prevention of the battery 2 will be described with reference to FIG. 6.

In step S100, the cooling control unit 5b determines whether to enhance the deterioration prevention of the battery 2. When the user sets the switch SW1 of the user terminal 20 to an ON state, the user terminal 20 transmits to the cooling control unit 5b a signal for enhancing the deterioration prevention of the battery 2. When the cooling control unit 5b determines to enhance the deterioration prevention of the battery 2 upon receiving the signal (YES), the process proceeds to step S110. On the other hand, when the switch SW1 is in an OFF state, the cooling control unit 5b determines not to enhance the deterioration prevention of the battery 2 (NO), and ends the control. In this case, the cooling control unit 5b can operate the cooling device 3 based on the target cooling temperature, which is a fixed value.

In step S110, the cooling control unit 5b acquires the position information of the vehicle V acquired by the position information acquisition unit 5c, and in step S120, the cooling control unit 5b specifies the region where the vehicle V is used based on the position information of the vehicle V.

After the cooling control unit 5b specifies the region where the vehicle V is used, in step S130, the cooling control unit 5b determines whether the user has input an electricity expense. When the user sets the switch SW2 to an ON state and inputs the electricity expense in the display area 23, the user terminal 20 transmits input information to the cooling control unit 5b. When the cooling control unit 5b receives the input information, the cooling control unit 5b determines that the user has input the electricity expense (YES), and the process proceeds to step S140.

In step S140, the cooling control unit 5b sets a target cooling temperature based on the electricity expense and the region where the vehicle V is used. For example, the target cooling temperature is set to a temperature that has the highest deterioration prevention effect of the battery 2 within a range of the electricity expense set by the user in the region where the vehicle V is used. When the target cooling temperature is set, the process proceeds to step S160.

On the other hand, in step S130, when the switch SW2 is in the OFF state or when the electricity expense is not input even when the switch SW2 is in the ON state, the cooling control unit 5b determines that the user has not input the electricity expense (NO), and the process proceeds to step S150.

In step S150, the cooling control unit 5b sets, as the target cooling temperature, a recommended value for the region where the vehicle V is used, and the process proceeds to step S160.

In step S160, the cooling control unit 5b estimates the deterioration prevention effect achieved by enhancing the deterioration prevention of the battery 2. In this case, the cooling control unit 5b may refer to various data input from the sensor unit 4 to the battery control unit 5a and stored in a memory (not shown), or may access an external server device and refer to various data.

In step S170, the cooling control unit 5b transmits to the user terminal 20 the deterioration prevention effect estimated in step S160, and notifies the user of the deterioration prevention effect.

Although an embodiment of the present disclosure has been described above with reference to the accompanying drawings, it is needless to say that the present disclosure is not limited to the embodiment. It is apparent to those skilled in the art that various changes and modifications can be conceived within the scope of the claims, and it is also understood that such changes and modifications naturally belong to the technical scope of the present disclosure. In addition, constituent elements in the above embodiment may be freely combined without departing from the spirit of the disclosure.

At least the following matters are described in the present specification. In the parentheses, the corresponding constituent elements and the like in the above embodiment are shown as an example, and the present disclosure is not limited thereto.

(1) A battery temperature adjustment system (battery temperature adjustment system 1), including:

a battery (battery 2) configured to store electric power from an external power source (external power source 10), and supply electric power to a motor (motor 7) as a drive source of a vehicle (vehicle V);

a cooling device cooling device 3) to which the electric power from the external power source and the electric power from the battery are selectively supplied and configured to cool the battery; and a control device (control device 5) configured to control the cooling device to lower a temperature of the battery to a target cooling temperature while the vehicle is stopped, in which the target cooling temperature is a variable value, and the control device obtains a target set by a user, and sets the target cooling temperature based on the target.

According, to (1), since the control device sets the target cooling temperature of the battery based on the target set by the user, the deterioration prevention effect of the battery intended by the user can be achieved.

(2) The battery temperature adjustment system according to (1), in which the target is a numerical value related to electric power consumption of the cooling device.

According to (2), since the target is a numerical value related to electric power consumption of the cooling device, the deterioration prevention effect of the battery intended by the user can be finely set.

(3) The battery temperature adjustment system according to (2), in which the numerical value represents an electricity expense corresponding to the electric power consumption of the cooling device for a predetermined time period.

According to (3), since the numerical value represents the electricity expense corresponding to the electric power consumption of the cooling device for the predetermined time period, the user can set the numerical value of the target in an easy-to-understand form.

(4) The battery temperature adjustment system according to (3), in which the predetermined time period is one month.

According to (4), since the predetermined time period is one month, the user can set the target in an easy-to-understand form.

(5) The battery temperature adjustment system according to (1), in which the target is a degree of a deterioration prevention effect of the battery selected by the user.

According to (5), since the target is the degree of the deterioration prevention effect of the battery selected by the user, the user can directly select the deterioration prevention effect of the battery intended by the user.

(6) The battery temperature adjustment system according to any one of (1) to (5), in which when the target is not obtained, the target cooling temperature is set to a recommended value based on a region where the vehicle is used.

Even when the same target cooling temperature is set, the deterioration prevention effect of the battery may be low depending on the region where the vehicle is used. According to (6), since when the target is not obtained, the target cooling temperature is set to the recommended value based on the region where the vehicle is used, even when the user does not set the target, the deterioration prevention effect of the battery can be exerted in any region where the vehicle is used.

(7) The battery temperature adjustment system according to (6), in which the control device acquires position information of the vehicle, and specifies the region where the vehicle is used based on the position information.

According to (7), since the control device specifies the region where the vehicle is used based on the position information of the vehicle, it is possible to appropriately specify the region where the vehicle is used.

(8) The battery temperature adjustment system according to any one of (1) to (7), in which the control device estimates a deterioration prevention effect of the battery at the target cooling temperature, and notifies the user of the deterioration prevention effect.

According to (8), since the control device notifies the user of the deterioration prevention effect, the user can confirm the deterioration prevention effect achieved by the target set by the user (9) The battery temperature adjustment system according to any one of (1) to (8), in which the target cooling temperature is variable within a range in which the cooling device does not consume more electric power than a predetermined value.

According to (9), since the target cooling temperature is variable within a range in which the cooling device does not consume more electric power than the predetermined value, it is possible to prevent the cooling device from consuming excessive electric power.

The invention claimed is:

1. A battery temperature adjustment system comprising:

a battery configured to store electric power from an external power source, and supply electric power to a motor as a drive source of a vehicle;

a cooling device to which the electric power from the external power source and the electric power from the battery are selectively supplied and configured to cool the battery; and a control device configured to control the cooling device to lower a temperature of the battery to a target cooling temperature while the vehicle is stopped, wherein:

the target cooling temperature is a variable value;

the control device obtains a target set by a user, and sets the target cooling temperature based on the target;

the target is a numerical value related to electric power consumption of the cooling device; and the numerical value represents an electricity expense corresponding to the electric power consumption of the cooling device for a predetermined time period.

2. The battery temperature adjustment system according to claim 1, wherein the predetermined time period is one month.

3. The battery temperature adjustment system according to claim 1, wherein when the target is not obtained, the target cooling temperature is set to a recommended value based on a region where the vehicle is used.

4. The battery temperature adjustment system according to claim 3, wherein the control device acquires position information of the vehicle, and specifies the region where the vehicle is used based on the position information.

5. The battery temperature adjustment system according to claim 1, wherein the control device estimates a deterioration prevention effect of the battery at the target cooling temperature, and notifies the user of the deterioration prevention effect.

6. The battery temperature adjustment system according to claim 1, wherein the target cooling temperature is variable within a range in which the cooling device does not consume more electric power than a predetermined value.

* * * * *